US008939206B2

(12) United States Patent
Langlotz et al.

(10) Patent No.: US 8,939,206 B2
(45) Date of Patent: *Jan. 27, 2015

(54) PROCESS FOR MINERAL OIL PRODUCTION USING HYDROPHOBICALLY ASSOCIATING COPOLYMERS

(75) Inventors: Björn Langlotz, Trostberg (DE); Roland Reichenbach-Klinke, Traunstein (DE); Christian Spindler, Ludwigshafen (DE); Benjamin Wenzke, Hamburg (DE)

(73) Assignee: BASF SE, Ludwigshafen (DE)

( * ) Notice: Subject to any disclaimer, the term of this patent is extended or adjusted under 35 U.S.C. 154(b) by 282 days.

This patent is subject to a terminal disclaimer.

(21) Appl. No.: 13/303,686

(22) Filed: Nov. 23, 2011

(65) Prior Publication Data
US 2012/0132420 A1 May 31, 2012

Related U.S. Application Data

(60) Provisional application No. 61/416,752, filed on Nov. 24, 2010.

(51) Int. Cl.
*E21B 43/22* (2006.01)
*E21B 43/16* (2006.01)
*C09K 8/588* (2006.01)
*E21B 43/20* (2006.01)

(52) U.S. Cl.
CPC .............. *E21B 43/162* (2013.01); *C09K 8/588* (2013.01); *E21B 43/20* (2013.01)
USPC .................... 166/270; 166/270.1; 166/275

(58) Field of Classification Search
CPC .................................. E21B 43/16; C09K 8/58
See application file for complete search history.

(56) References Cited

U.S. PATENT DOCUMENTS

| 5,741,947 | A | 4/1998 | Wolf et al. | |
|---|---|---|---|---|
| 6,392,596 | B1 | 5/2002 | Lin et al. | |
| 2004/0024154 | A1 | 2/2004 | Schinabeck et al. | |
| 2008/0200590 | A1 | 8/2008 | Schinabeck et al. | |
| 2010/0331510 | A1 | 12/2010 | Reichenbach-Klinke et al. | |
| 2011/0088899 | A1* | 4/2011 | Stehle et al. | 166/270 |

FOREIGN PATENT DOCUMENTS

| CA | 832 277 A | 1/1970 |
|---|---|---|
| DE | 4325237 A1 | 2/1995 |
| DE | 100 37 629 A1 | 2/2002 |
| DE | 10243361 A1 | 4/2004 |
| DE | 10 2004 032 304 A1 | 2/2006 |
| EP | 705 854 A1 | 4/1996 |
| WO | WO 85/03510 | 8/1985 |
| WO | WO-2010/133527 A2 | 11/2010 |
| WO | WO-2011/015520 A1 | 2/2011 |

OTHER PUBLICATIONS

U.S. Appl. No. 13/303,649, filed Nov. 23, 2011, BASF SE.
U.S. Appl. No. 13/303,773, filed Nov. 23, 2011, BASF SE.
U.S. Appl. No. 13/378,684, filed Dec. 12, 2011, BASF SE.
U.S. Appl. No. 13/292,264.
D. G. Kessel, *Journal of Petroleum Science and Engineering*, 2 (1989) 81-101.
R.S. Seright, "The effects of mechanical degradation and viscoelastic behavior on injectivity of polyacrylamide solutions", SPE Journal 23(3), 1983, pp. 475-485 ).
R.S. Seright, M. Seheult and T. Talashek "Injectivity characteristics of EOR polymers", SPE Reservoir Evaluation & Enginnering, 12 (5), 2009, pp. 783-792.
D. Morel, M. Vert, S. Jouenne, E. Nahas, "Polymer injection in deep offshore field: The Dalia Angola case", SPE Annual Technical Conference and Exhibition, Sep. 2008, Denver Colorado, USA, paper No. SPE 116672), pp. 1-12.
J.M. Maerker, Shear Degradation of partially hydrolyzes polyacrylamide solutions, SPE Journal 15(4), 1975, pp. 311-322.
Taylor, K.C. and Nasr-El-Din, H.A. in J. Petr. Sci. Eng. 1998, 19, 265-280.
Iglauer et al., New surfactant classes for enhanced oil recovery and their tertiary oil recovery potential, Journal of Petroleum Science and Engineering 71 (2010) 23-29.
Petroleum, Enhanced Oil Recovery, Kirk-Othmer, Encyclopedia of Chemical Technology, online edition, John Wiley & Sons, 2010 (29 pp).
Petroleum, Kirk-Othmer, Encyclopedia of Chemical Technology, online edition, John Wiley & Sons, 2010 (42 pp).
Rashidi et al, Viscosity Study of Salt Tolerant Polymers, Journal of Applied Polymer Science DOI 10.1002/app-0 (2009), pp. 1551-1557.
W. Zhou et al., Effect of Sodium Dodecyl Benzene Sulfonate on Water-Soluble Hydrophobically Associatign Polymer Solutions, Journal of Canadian Petroleum Technology, Feb. 2004, vol. 43, No. 2—pp. 13-16.
U.S. Appl. No. 13/440,049, filed Apr. 5, 2012, Reichenbach-Klinke et al.

* cited by examiner

*Primary Examiner* — Zakiya W Bates
(74) *Attorney, Agent, or Firm* — Drinker Biddle & Reath LLP

(57) ABSTRACT

A process for mineral oil production, in which an aqueous formulation comprising at least one water-soluble, hydrophobically associating copolymer is injected through at least one injection borehole into a mineral oil deposit, and crude oil is withdrawn from the deposit having a deposit temperature of 35° C. to 120° C., preferably 40° C. to 90° C., through at least one production borehole, wherein the water-soluble, hydrophobically associating copolymer comprises at least acrylamide or derivatives thereof, a monoethylenically unsaturated monomer having anionic groups and a monoethylenically unsaturated monomer which can bring about the association of the copolymer.

17 Claims, 4 Drawing Sheets

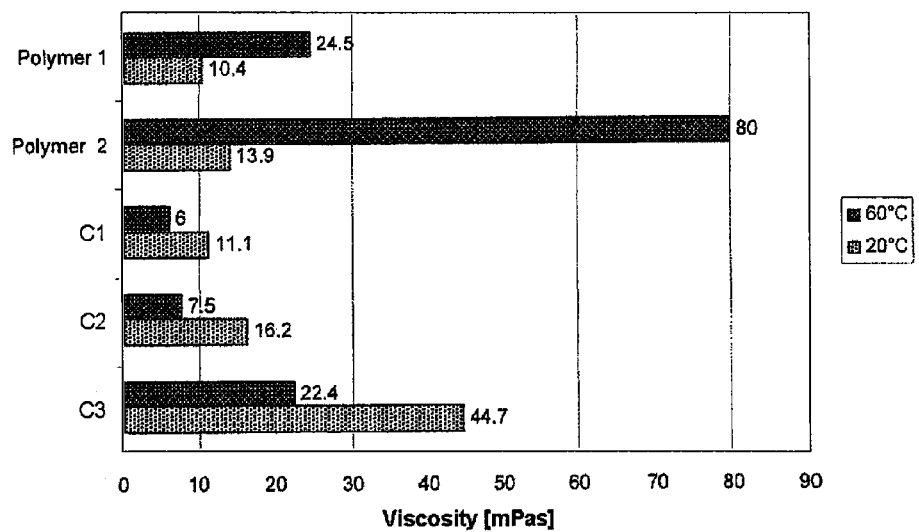
Fig. 1: Results of test series 1
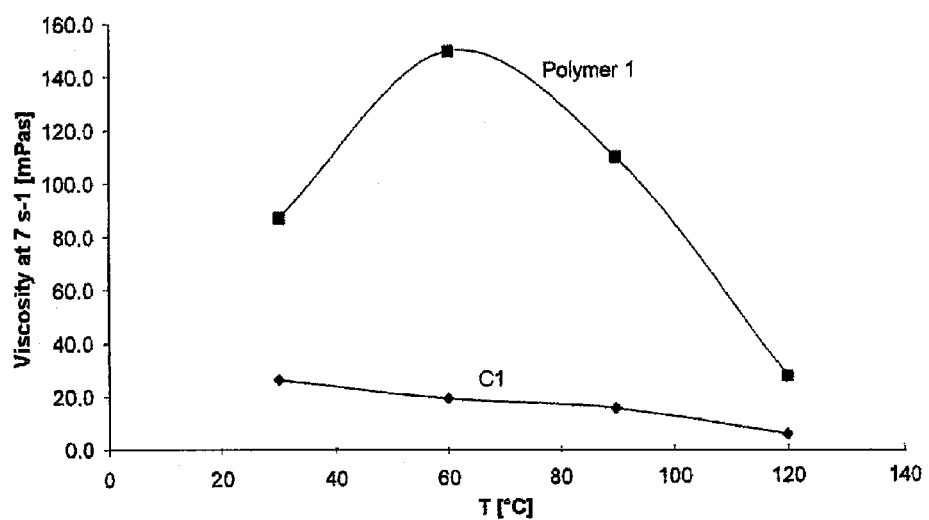
Fig. 2: Results of test series 2

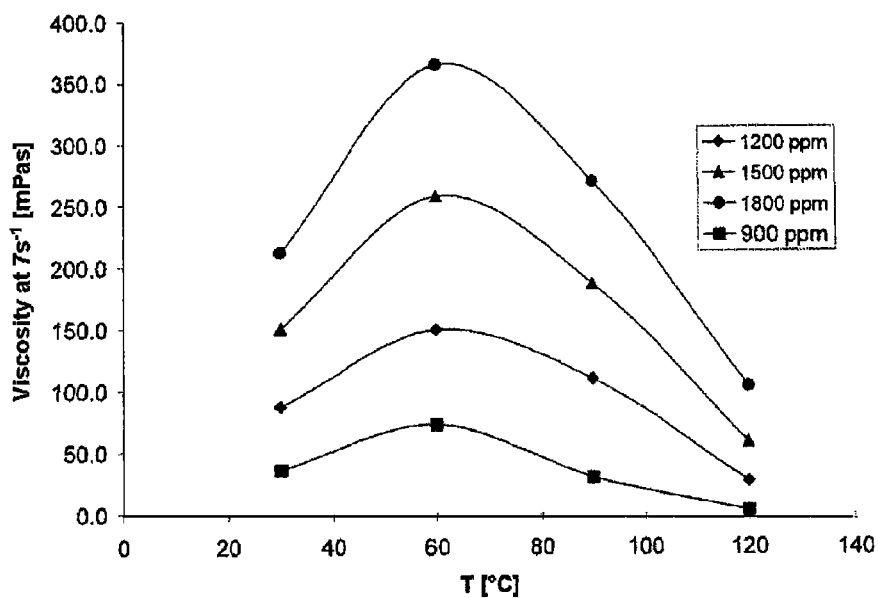
Fig. 3: Results of test series 3
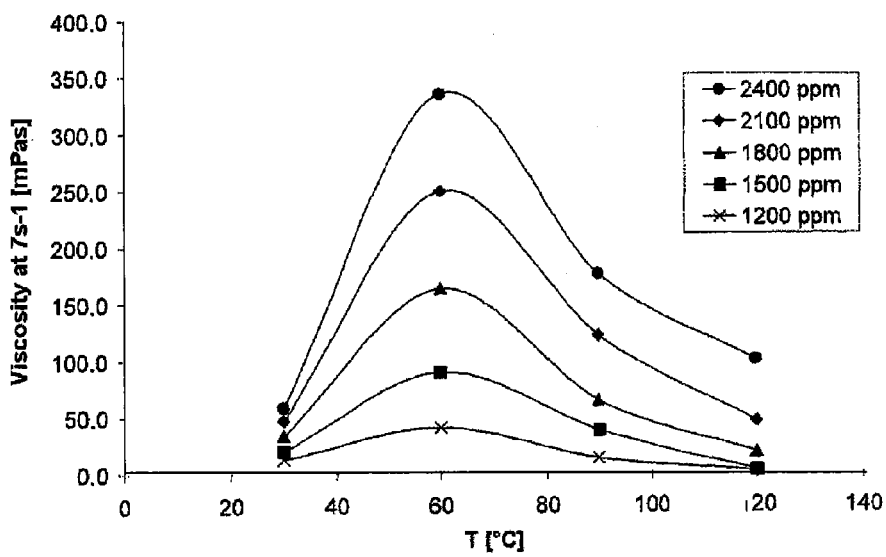
Fig. 4: Results of test series 4

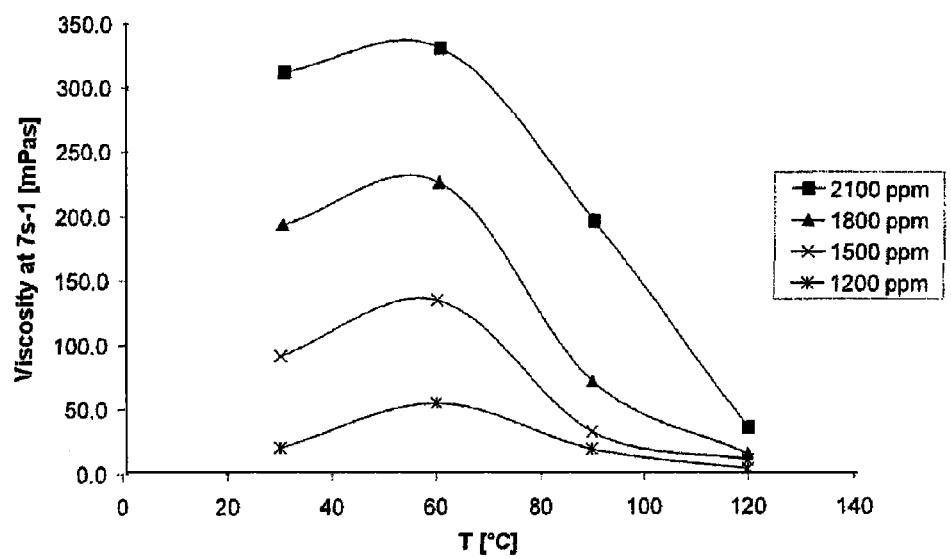
Fig. 5: Results of test series 5
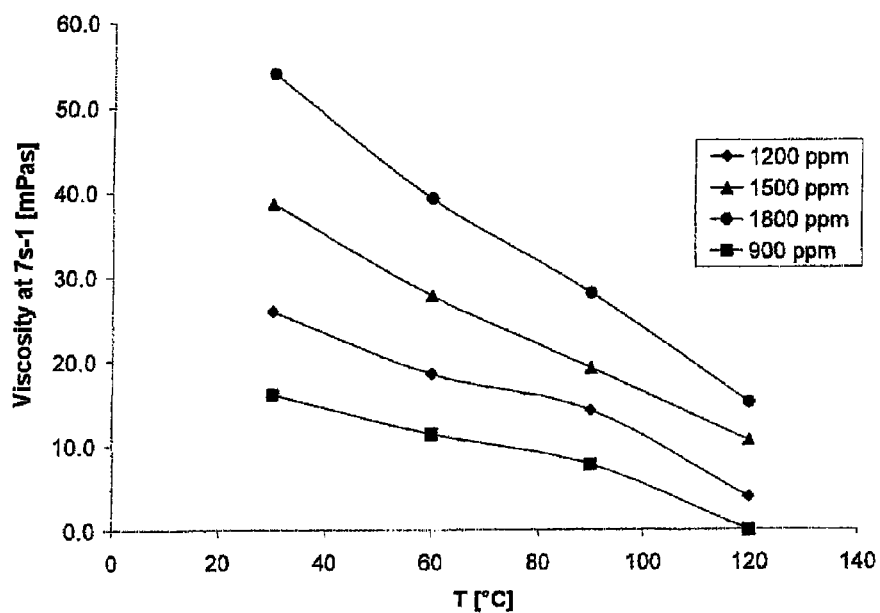
Fig. 6: Results of test series 6

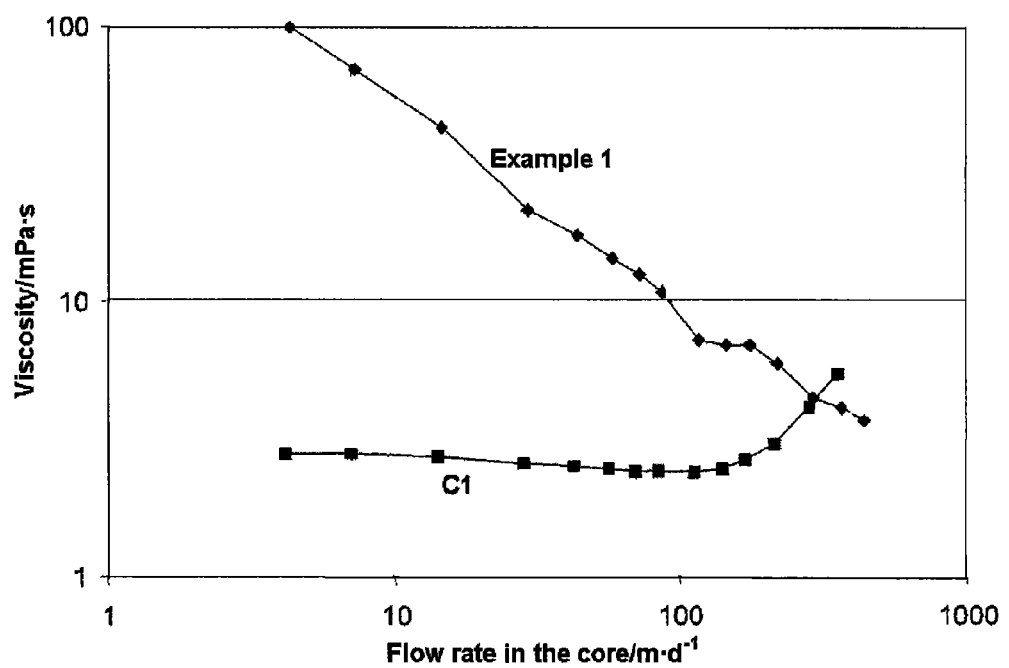
Fig. 7: Results of the core flooding test

PROCESS FOR MINERAL OIL PRODUCTION USING HYDROPHOBICALLY ASSOCIATING COPOLYMERS

CROSS-REFERENCE TO RELATED APPLICATION

This application claims the benefit of U.S. Provisional Application Ser. No. 61/416,752 filed Nov. 24, 2010, the entire contents of which are incorporated herein by reference in its entirety.

FIELD OF THE INVENTION

The present invention relates to a process for mineral oil production, in which an aqueous formulation comprising at least one water-soluble, hydrophobically associating copolymer is injected through at least one injection borehole into a mineral oil deposit having a deposit temperature of 35° C. to 120° C., preferably 40° C. to 90° C., and crude oil is withdrawn from the deposit through at least one production borehole, wherein the water-soluble, hydrophobically associating copolymer comprises at least acrylamide or derivatives thereof, a monomer having anionic groups and a monomer which can bring about the hydrophobic association of the copolymer.

BACKGROUND

In natural mineral oil deposits, mineral oil is present in the cavities of porous reservoir rocks which are sealed toward the surface of the earth by impermeable top layers. The cavities may be very fine cavities, capillaries, pores or the like. Fine pore necks may, for example, have a diameter of only approx. 1 μm. As well as mineral oil, including fractions of natural gas, a deposit also comprises water with a greater or lesser salt content.

In mineral oil production, a distinction is drawn between primary, secondary and tertiary production.

In primary production, after commencement of drilling of the deposit, the mineral oil flows of its own accord through the borehole to the surface owing to the autogenous pressure of the deposit. The autogenous pressure can be caused, for example, by gases present in the deposit, such as methane, ethane or propane. The autogenous pressure of the deposit, however, generally declines relatively rapidly on extraction of mineral oil, such that usually only approx. 5 to 10% of the amount of mineral oil present in the deposit, according to the deposit type, can be produced by means of primary production. Thereafter, the autogenous pressure is no longer sufficient to produce mineral oil.

After primary production, secondary production is therefore typically used. In secondary production, in addition to the boreholes which serve for the production of the mineral oil, known as the production boreholes, further boreholes are drilled into the mineral oil-bearing formation. These are known as injection boreholes, through which water is injected into the deposit (known as "water flooding"), in order to maintain the pressure or to increase it again. As a result of the injection of the water, the mineral oil is gradually forced through the cavities in the formation, proceeding from the injection borehole, in the direction of the production borehole. However, this works only for as long as the cavities are completely filled with oil and the more viscous oil is pushed onward by the water. As soon as the mobile water breaks through cavities, it flows on the path of least resistance from this time onward, i.e. through the channel formed, and no longer pushes the oil onward. By means of primary and secondary production, therefore, generally only approx. 30 to 35% of the amount of mineral oil present in the deposit can be produced.

After the measures of secondary mineral oil production, measures of tertiary mineral oil production (also known as "Enhanced Oil Recovery (EOR)") are therefore also used to further enhance the oil yield. This includes processes in which suitable chemicals, such as surfactants and/or polymers, are used as assistants for oil production. An overview of tertiary oil production using chemicals can be found, for example, in the article by D. G. Kessel, *Journal of Petroleum Science and Engineering*, 2 (1989) 81-101.

The techniques of tertiary mineral oil production include what is known as "polymer flooding". Polymer flooding involves injecting an aqueous solution of a thickening polymer through the injection boreholes into the mineral oil deposit, the viscosity of the aqueous polymer solution being matched to the viscosity of the mineral oil. As a result of the injection of the polymer solution, the mineral oil, as in the case of water flooding, is forced through the cavities mentioned in the formation, proceeding from the injection borehole, in the direction of the production borehole, and the mineral oil is produced through the production borehole. By virtue of the fact that the polymer formulation, however, has about the same viscosity as the mineral oil, the risk is reduced that the polymer formulation breaks through to the production borehole with no effect, and hence the mineral oil is mobilized much more homogeneously than in the case of use of mobile water. It is thus possible to mobilize additional mineral oil in the formation. Details of polymer flooding and of polymers suitable for this purpose are disclosed, for example, in "*Petroleum, Enhanced Oil Recovery, Kirk-Othmer, Encyclopedia of Chemical Technology*, online edition, John Wiley & Sons, 2010".

For polymer flooding, a multitude of different thickening polymers have been proposed, especially high molecular weight polyacrylamide, copolymers of acrylamide and further comonomers, for example vinylsulfonic acid or acrylic acid. Polyacrylamide may especially be partly hydrolyzed polyacrylamide, in which some of the acrylamide units have been hydrolyzed to acrylic acid. In addition, it is also possible to use naturally occurring polymers, for example xanthan or polyglycosylglucan, as described, for example, by U.S. Pat. No. 6,392,596 B1 or CA 832 277.

Also known is the use of hydrophobically associating copolymers for polymer flooding. These are understood by the person skilled in the art to mean water-soluble polymers which have lateral or terminal hydrophobic groups, for example relatively long alkyl chains. In aqueous medium, such hydrophobic groups can associate with themselves or with other substances having hydrophobic groups. This forms an associative network by which the medium is thickened. Details of the use of hydrophobically associating copolymers for tertiary mineral oil production are described, for example, in the review article by Taylor, K. C. and Nasr-El-Din, H. A. in *J. Petr. Sci. Eng.* 1998, 19, 265-280.

EP 705 854 A1, DE 100 37 629 A1 and DE 10 2004 032 304 A1 disclose water-soluble, hydrophobically associating copolymers and the use thereof, for example in the construction chemistry sector. The copolymers described comprise acidic monomers, for example acrylic acid, vinylsulfonic acid, acrylamidomethylpropanesulfonic acid, basic monomers such as acrylamide, dimethylacrylamide, or monomers comprising cationic groups, for example monomers having ammonium groups, and also monomers which can bring about the hydrophobic association of the individual polymer chains.

Our prior application WO 2010/133527 A2 discloses hydrophobically associating copolymers which comprise at least hydrophilic, monoethylenically unsaturated monomers, for example acrylamide, and monoethylenically unsaturated, hydrophobically associating monomers. The hydrophobically associating monomers have a block structure and have—in this sequence—an ethylenically unsaturated group, optionally a linking group, a first polyoxyalkylene block which comprises at least 50 mol % of ethyleneoxy groups, and a second polyoxyalkylene group which consists of alkyleneoxy groups having at least 4 carbon atoms. The application discloses the use of such copolymers as thickeners, for example for polymer flooding, for construction chemical applications or for detergent formulations.

Our prior application WO 2011/015520 A1 discloses a process for preparing hydrophobically associating copolymers by polymerizing water-soluble, monoethylenically unsaturated surface-active monomers and monoethylenically unsaturated hydrophilic monomers in the presence of surfactants, and the use of such copolymers for polymer flooding.

For polymer flooding, an aqueous polymer solution is injected through a borehole (called the injection borehole) into a mineral oil deposit, and the viscosity of the polymer solution under formation conditions should correspond approximately to the viscosity of the mineral oil. Suitable polymers for polymer flooding must therefore also have the thickening action under the conditions of the mineral oil deposit, i.e. at temperatures above room temperature and in the presence of formation water with a high salt content. Formation waters may in the extreme case comprise up to 35% by weight of salts. The salts are, for example, alkali metal salts, but also alkaline earth metal salts. Formation temperatures may be up to 150° C.

Studies on partly hydrolyzed polyacrylamide and copolymers of acrylamide and acrylamide-methylpropanesulfonic acid show that the salt tolerance of the polymers can be enhanced by the incorporation of sulfo groups (see, for example, Masoud Rashidi, Anne Marit Blokhus, Arne Skauge, *Journal of Applied Polymer Science*, Vol. 117 (2010), pages 1551-1557). In the case of such polymers, however, the viscosity decreases with increasing temperature. Thus, to achieve a viscosity sufficient for polymer flooding, higher amounts of polymer have to be used, which impairs the economic viability of polymer flooding.

BRIEF SUMMARY

It was an object of the invention to provide a process for polymer flooding with which satisfactory results are achieved even at relatively high formation temperatures.

Accordingly, a process for mineral oil production has been found, in which an aqueous formulation comprising at least one water-soluble, hydrophobically associating copolymer is injected through at least one injection borehole into a mineral oil deposit, and crude oil is withdrawn from the deposit through at least one production borehole, and wherein the water-soluble, hydrophobically associating copolymer comprises (a) 0.1 to 15% by weight of at least one monoethylenically unsaturated, hydrophobically associating monomer (a) selected from the group of

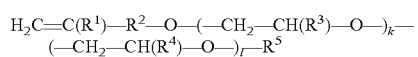  (I),

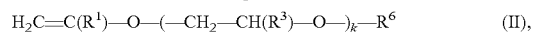  (II),

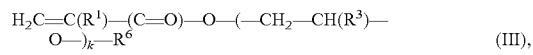  (III), where the $-(-CH_2-CH(R^3)-O-)_k-$ and $-(-CH_2-CH(R^4)-O-)_l-$ units are arranged in block structure in the sequence shown in formula (I) and the radicals and indices are each defined as follows:

k: a number from 10 to 150, l: a number from 5 to 25, $R^1$: H or methyl, $R^2$: a single bond or a divalent linking group selected from the group of $-(C_nH_{2n})-^{[R2a]}$, $-O-(C_nH_{2n'})-^{[R2b]}$ and $-C(O)-O-(C_{n''}H_{2n''})-^{[R2c]}$, where n, n' and n" are each natural numbers from 1 to 6, $R^3$: each independently H, methyl or ethyl, with the proviso that at least 50 mol % of the $R^2$ radicals are H, $R^4$: each independently a hydrocarbyl radical having at least 2 carbon atoms or an ether group of the general formula $-CH_2-O-R^{4'}$, where $R^{4'}$ is a hydrocarbyl radical having at least 2 carbon atoms, $R^5$: H or a hydrocarbyl radical having 1 to 30 carbon atoms, $R^6$: an aliphatic and/or aromatic, straight-chain or branched hydrocarbyl radical having 8 to 40 carbon atoms, and also (b) 85 to 99.9% by weight of at least two monoethylenically unsaturated, hydrophilic monomers (b) different than (a), where the monomers (b) comprise (b1) at least one uncharged, monoethylenically unsaturated, hydrophilic monomer (b1), selected from the group of (meth)acrylamide, N-methyl(meth)acrylamide, N,N'-dimethyl(meth)acrylamide or N-methylol(meth)acrylamide, and (b2) at least one anionic, monoethylenically unsaturated, hydrophilic monomer (b2) which at least one acidic group selected from the group of $-COOH$, $-SO_3H$ and $-PO_3H_2$ and salts thereof, where the proportions are each based on the total amount of all monomers in the copolymer, the copolymer has a weight-average molecular weight $M_W$ of $1*10^6$ g/mol to $30*10^6$ g/mol, the amount of the copolymer in the formulation is 0.02 to 2% by weight, and the temperature of the mineral oil deposit is 35° C. to 120° C.

In a preferred embodiment of the invention, the temperature of the mineral oil deposit is 40° C. to 90° C.

In a further preferred embodiment, the aqueous formulation further comprises salts in an amount of 20 000 ppm to 350 000 ppm.

It has been found that, surprisingly, the viscosity of the aqueous polymer formulations used for the process at first does not decrease with rising temperature, but actually increases. The viscosity passes through a maximum and begins to decrease again only at higher temperatures. This achieves a particularly good ratio of viscosity achieved to amount of substance used.

BRIEF DESCRIPTION OF THE DRAWINGS

FIG. 1 is a graph illustrating the results of test series 1 showing the viscosity of the solutions measured at 20° C. and at 60° C.

FIG. 2 is a graph illustrating the results of test series 2 showing the viscosity of the solutions measured at 30° C., 60° C., 90° C. and 120° C.

FIG. 3 is a graph illustrating the results of test series 3 showing the viscosity of the solutions measured at 30° C., 60° C., 90° C. and 120° C.

FIG. 4 is a graph illustrating the results of test series 4 showing the viscosity of the solutions measured at 30° C., 60° C., 90° C. and 120° C.

FIG. 5 is a graph illustrating the results of test series 5 showing the viscosity of the solutions measured at 30° C., 60° C., 90° C. and 120° C.

FIG. 6 is a graph illustrating the results of test series 6 showing the viscosity of the solutions measured at 30° C., 60° C., 90° C. and 120° C.

FIG. 7 is a graph illustrating the results of the core flooding test showing the apparent viscosity of the two polymer solutions as a function of the flow rate in the core in m/day

DETAILED DESCRIPTION OF THE PREFERRED EMBODIMENTS

With regard to the invention, the following should be stated specifically:
Hydrophobically Associating Copolymers Used For the process according to the invention for mineral oil production, an aqueous formulation of at least one water-soluble, hydrophobically associating copolymer is used and is injected through an injection borehole into a mineral oil deposit.

The term "hydrophobically associating copolymers" is known in principle to those skilled in the art.

This comprises water-soluble copolymers which, as well as hydrophilic molecular components, have hydrophobic groups. In aqueous solution, the hydrophobic groups can associate with themselves or with other substances having hydrophobic groups due to intermolecular forces. This gives rise to a polymeric network joined by intermolecular forces, which thickens the aqueous medium.

In the ideal case, the copolymers used in accordance with the invention should be miscible with water in any ratio. According to the invention, however, it is sufficient when the copolymers are water-soluble at least at the desired use concentration and at the desired pH. In general, the solubility of the copolymer in water at room temperature under the use conditions should be at least 25 g/l.

According to the invention, the water-soluble, hydrophobically associating copolymer comprises 0.1 to 15% by weight of at least one monoethylenically unsaturated, hydrophobically associating monomer (a) and 85 to 99.9% by weight of at least two monoethylenically unsaturated, hydrophilic monomers (b) different than (a). In addition, it is optionally possible for further, ethylenically unsaturated, preferably monoethylenically unsaturated, monomers (c) different than the monomers (a) and (b) to be present in an amount of up to 14.9% by weight. The amounts mentioned are based in each case on the sum of all monomers in the copolymer. Preference is given to using exclusively monoethylenically unsaturated monomers.
Monomers (a)

The water-soluble, hydrophobically associating copolymer used comprises at least one monoethylenically unsaturated monomer (a) which imparts hydrophobically associating properties to the copolymer and shall therefore be referred to hereinafter as "hydrophobically associating monomer". According to the invention, the monomers (a) are selected from the group of

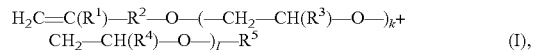

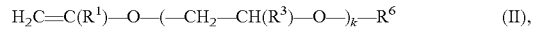

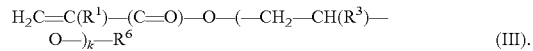

Monomers (a) of the Formula (I)

In the monomers (a) of the formula (I), an ethylenic group $H_2C=C(R^1)-$ is bonded via a divalent linking group $-R^2-O-$ to a polyoxyalkylene radical with block structure $-(-CH_2-CH(R^3)-O-)_k-(-CH_2-CH(R^4)-O-)_l-R^5$, where the two blocks $-(-CH_2-CH(R^3)-O-)_k$ and $-(-CH_2-CH(R^4)-O-)_l$ are arranged in the sequence shown in formula (I). The polyoxyalkylene radical has either a terminal OH group (for $R^5=H$) or a terminal ether group $-OR^5$ (if $R^5$ is a hydrocarbyl radical).

In the abovementioned formula, $R^1$ is H or a methyl group.

$R^2$ is a single bond or a divalent linking group selected from the group of $-(C_nH_{2n})-$ [$R^{2a}$ group], $-O-(C_nH_{2n'})-$ [$R^{2b}$ group]- and $-C(O)-O-(C_{n''}H_{2n''})-$ [$R^{2c}$ group]. In the formulae mentioned, n, n' and n'' are each a natural number from 1 to 6. In other words, the linking group comprises straight-chain or branched aliphatic hydrocarbyl groups having 1 to 6 hydrocarbon atoms, which are joined to the ethylenic group $H_2C=C(R^1)-$ directly, via an ether group $-O-$ or via an ester group $-C(O)-O-$. The $-(C_nH_{2n})-$, $-(C_{n'}H_{2n'})-$ and $-(C_{n''}H_{2n''})-$ groups are preferably linear aliphatic hydrocarbyl groups.

The $R^{2a}$ group is preferably a group selected from $-CH_2-$, $-CH_2-CH_2-$ and $-CH_2-CH_2-CH_2-$, more preferably a methylene group $-CH_2-$.

The $R^{2b}$ group is preferably a group selected from $-O-CH_2-CH_2-$, $-O-CH_2-CH_2-CH_2-$ and $-O-CH_2-CH_2-CH_2-CH_2-$, more preferably $-O-CH_2-CH_2-CH_2-CH_2-$.

The $R^{2c}$ group is preferably a group selected from $-C(O)-O-CH_2-CH_2-$, $-C(O)O-CH(CH_3)-CH_2-$, $-C(O)O-CH_2-CH(CH_3)-$, $-C(O)O-CH_2-CH_2-CH_2-$ and $-C(O)O-CH_2-CH_2-CH_2-CH_2-$, more preferably $-C(O)-O-CH_2-CH_2-$ and $-C(O)O-CH_2-CH_2-CH_2-CH_2-$, and most preferably $-C(O)-O-CH_2-CH_2-$.

The $R^2$ group is more preferably an $R^{2a}$ or $R^{2b}$ group, more preferably an $R^{2b}$ group.

In addition, $R^2$ is more preferably a group selected from $-CH_2-$ and $-O-CH_2-CH_2-CH_2-CH_2-$, most preferably $-O-CH_2-CH_2-CH_2-CH_2-$.

The monomers (I) also have a polyoxyalkylene radical which consists of the units $-(-CH_2-CH(R^3)-O-)_k$ and $-(-CH_2-CH(R^4)-O-)_l$ where the units are arranged in block structure in the sequence shown in formula (I). The transition between the two blocks may be abrupt or else continuous.

In the $-(-CH_2-CH(R^3)-O-)_k$ block, the $R^3$ radicals are each independently H, methyl or ethyl, preferably H or methyl, with the proviso that at least 50 mol % of the $R^3$ radicals are H. Preferably at least 75 mol % of the $R^3$ radicals are H, more preferably at least 90 mol %, and they are most preferably exclusively H. The block mentioned is thus a polyoxyethylene block which may optionally also have certain proportions of propylene oxide and/or butylene oxide units, preferably a pure polyoxyethylene block.

The number of alkylene oxide units k is a number from 10 to 150, preferably 12 to 100, more preferably 15 to 80, even more preferably 20 to 30 and, for example, approx. 22 to 25.

It is clear to the person skilled in the art in the field of the polyalkylene oxides that the numbers mentioned are averages of distributions.

In the second —($-CH_2-CH(R^4)-O-$)$_j$— block, the $R^4$ radicals are each independently hydrocarbyl radicals of at least 2 carbon atoms, preferably at least 3, more preferably 3 to 10 and most preferably 3 to 8 carbon atoms and for example 3 to 4 carbon atoms. This may be an aliphatic and/or aromatic, linear or branched carbon radical. It is preferably an aliphatic radical.

Examples of suitable $R^4$ radicals comprise ethyl, n-propyl, n-butyl, n-pentyl, n-hexyl, n-heptyl, n-octyl, n-nonyl or n-decyl, and phenyl. Examples of preferred radicals comprise n-propyl, n-butyl, n-pentyl, particular preference being given to an n-propyl radical.

The $R^4$ radicals may also be ether groups of the general formula —$CH_2$—O—$R^{4'}$ where $R^{4'}$ is an aliphatic and/or aromatic, linear or branched hydrocarbyl radical having at least 2 carbon atoms, preferably at least 3 and more preferably 3 to 10 carbon atoms. Examples of $R^{3'}$ radicals comprise n-propyl, n-butyl, n-pentyl, n-hexyl, 2-ethylhexyl, n-heptyl, n-octyl, n-nonyl n-decyl or phenyl.

The —($-CH_2-CH(R^4)-O-$)$_j$— block is thus a block which consists of alkylene oxide units having at least 4 carbon atoms, preferably at least 5 carbon atoms, especially 5 to 10 carbon atoms, and/or glycidyl ethers having an ether group of at least 2, preferably at least 3, carbon atoms. Preferred $R^3$ radicals are the hydrocarbyl radicals mentioned; the units of the second terminal block are more preferably alkylene oxide units comprising at least 5 carbon atoms, such as pentene oxide units or units of higher alkylene oxides.

The number of alkylene oxide units I is a number from 5 to 25, preferably 6 to 20, more preferably 8 to 18, even more preferably 10 to 15 and, for example, approx. 12.

The $R^5$ radical is H or a preferably aliphatic hydrocarbyl radical having 1 to 30 carbon atoms, preferably 1 to 10 and more preferably 1 to 5 carbon atoms. $R^5$ is preferably H, methyl or ethyl, more preferably H or methyl and most preferably H.

In the monomers of the formula (I), a terminal monoethylenic group is joined to a polyoxyalkylene group with block structure, specifically firstly to a hydrophilic block having polyethylene oxide units, which is in turn joined to a second terminal hydrophobic block formed at least from butene oxide units, preferably at least pentene oxide units, or units of higher alkylene oxides, for example dodecene oxide. The second block has a terminal —$OR^5$— group, especially an OH-group. The terminal —($-CH_2-CH(R^4)-O-$)$_j$ block with the $R^4$ radicals is responsible for the hydrophobic association of the copolymers prepared using the monomers (a). Etherification of the OH end group is an option which may be selected by the person skilled in the art according to the desired properties of the copolymer. A terminal hydrocarbyl group is, however, not required for the hydrophobic association, and the hydrophobic association also works with a terminal OH group.

It is clear to the person skilled in the art in the field of polyalkylene oxide block copolymers that the transition between the two blocks, according to the method of preparation, may be abrupt or else continuous. In the case of a continuous transition, there is a transition zone between the two blocks, which comprises monomers of both blocks. When the block boundary is fixed at the middle of the transition zone, the first block —($-CH_2-CH(R^3)-O-$)$_k$ may accordingly also have small amounts of —$CH_2$—$CH(R^4)$— O— units and the second block —($-CH_2-CH(R^4)-$ $O-$)$_j$— small amounts of —$CH_2$—$CH(R^3)$—O— units, though these units are not distributed randomly over the block but arranged in the transition zone mentioned.

Preparation of the Monomers (a) of the Formula (I)

The hydrophobically associating monomers (a) of the formula (I) can be prepared by methods known in principle to those skilled in the art.

To prepare the monomers (a), a preferred preparation process proceeds from suitable monoethylenically unsaturated alcohols (IV) which are subsequently alkoxylated in a two-stage process such that the block structure mentioned is obtained. This gives monomers (a) of the formula (I) where $R^5$=H. These can optionally be etherified in a further process step.

The type of ethylenically unsaturated alcohols (IV) to be used is guided here especially by the $R^2$ group.

When $R^2$ is a single bond, the starting materials are alcohols (IV) of the general formula $H_2C=C(R^1)-O-(-CH_2-CH(R^7)-O-)_d-H$ (IVa) where $R^1$ is as defined above, $R^7$ is H and/or $CH_3$, preferably H, and d is from 1 to 5, preferably 1 or 2. Examples of such alcohols comprise diethylene glycol vinyl ether $H_2C=CH-O-CH_2-CH_2-O-CH_2-CH_2-OH$ or dipropylene glycol vinyl ether $H_2C=CH-O-CH_2-CH(CH_3)-O-CH_2-CH(CH_3)-OH$, preferably diethylene glycol vinyl ether.

To prepare monomers (a) in which $R^2$ is not a single bond, it is possible to use alcohols of the general formula $H_2C=C(R^1)-R^2-OH$ (IVb) or alcohols which already have alkoxy groups and are of the formula $H_2C=C(R^1)-R^2-O-(-CH_2-CH(R^7)-O-)_d-H$ (IVc), where $R^7$ and d are each as defined above, and $R^2$ in each case is selected from the group of $R^{2a}$, $R^{2b}$ and $R^{2c}$.

The preparation of the monomers with a linking $R^{2a}$ group preferably proceeds from alcohols of the formula $H_2C=C(R^1)-(C_nH_{2n})-OH$, especially $H_2C=CH-(C_nH_{2n})-OH$, or alcohols of the formula $H_2C=C(R^1)-O-(-CH_2-CH(R^7)-O-)_d-H$. Examples of preferred alcohols comprise allyl alcohol $H_2C=CH-CH_2-OH$ or isoprenol $H_2C=C(CH_3)-CH_2-CH_2-OH$.

The preparation of the monomers with a linking $R^{2b}$ group proceeds from vinyl ethers of the formula $H_2C=C(R^1)-O-(C_nH_{2n'})-OH$, preferably $H_2C=CH-O-(C_nH_{2n'})-OH$. It is more preferably possible to use ω-hydroxybutyl vinyl ether $H_2C=CH-O-CH_2-CH_2-CH_2-CH_2-OH$.

The preparation of the monomers with a linking $R^{2c}$ group proceeds from hydroxyalkyl (meth)acrylates of the general formula $H_2C=C(R^1)-C(O)-O-(C_{n''}H_{2n''})-OH$, preferably $H_2C=C(R^1)-C(O)-O-(C_{n''}H_{2n''})-OH$. Examples of preferred hydroxyalkyl(meth)acrylates comprise hydroxyethyl(meth)acrylate $H_2C=C(R^1)-C(O)-O-CH_2-CH_2-OH$ and hydroxybutyl (meth)acrylate $H_2C=C(R^1)-C(O)-O-CH_2-CH_2-CH_2-CH_2-OH$.

The starting compounds mentioned are alkoxylated, specifically in a two-stage process, first with ethylene oxide, optionally in a mixture with propylene oxide and/or butylene oxide, and in a second step with alkylene oxides of the general formula (Xa) or (Xb)

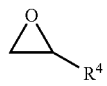
(Xa)

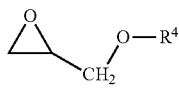
(Xb)

where $R^4$ in (Xa) and $R^{4'}$ in (Xb) are each as defined at the outset.

The performance of an alkoxylation including the preparation of the block copolymers from different alkylene oxides is known in principle to those skilled in the art. It is likewise known to those skilled in the art that the reaction conditions, especially the selection of the catalyst, can influence the molecular weight distribution of the alkoxylates and the orientation of the alkylene oxide units in a polyether chain.

The alkoxylates can be prepared, for example, by base-catalyzed alkoxylation. For this purpose, the alcohol used as the starting material can be admixed in a pressure reactor with alkali metal hydroxides, preferably potassium hydroxide, or with alkali metal alkoxides, for example sodium methoxide. By means of reduced pressure (e.g. <100 mbar) and/or increasing the temperature (30 to 150° C.), water still present in the mixture can be removed. Thereafter, the alcohol is present as the corresponding alkoxide. This is followed by inertization with inert gas (e.g. nitrogen) and, in a first step, stepwise addition of ethylene oxide, optionally in a mixture with propylene oxide and/or butylene oxide, at temperatures of 60 to 180° C., preferably 130 to 150° C. The addition is typically effected within 2 to 5 h, though the invention should not be restricted thereto. After the addition has ended, the reaction mixture is appropriately allowed to continue to react, for example for ½ h to 1 h. In a second step, alkylene oxides of the general formula (Xb) are subsequently metered in stepwise. The reaction temperature in the second stage can be maintained or else altered. A reaction temperature lower by approx. 10 to 25° C. than in the first stage has been found to be useful.

The alkoxylation can also be undertaken by means of techniques which lead to narrower molecular weight distributions than the base-catalyzed synthesis. For this purpose, the catalysts used may, for example, be double hydroxide clays as described in DE 43 25 237 A1. The alkoxylation can more preferably be effected using double metal cyanide catalysts (DMC catalysts). Suitable DMC catalysts are disclosed, for example, in DE 102 43 361A1, especially paragraphs [0029] to [0041] and the literature cited therein. For example, it is possible to use catalysts of the Zn—Co type. To perform the reaction, the alcohol used as the starting material can be admixed with the catalyst, and the mixture can be dewatered as described above and reacted with the alkylene oxides as described. Typically, not more than 250 ppm of catalyst based on the mixture are used, and the catalyst can remain in the product due to this small amount.

The alkoxylation can additionally also be undertaken under acid catalysis. The acids may be Brønsted or Lewis acids. To perform the reaction, the alcohol used as the starting material can be admixed with the catalyst, and the mixture can be dewatered as described above and reacted with the alkylene oxides as described. At the end of the reaction, the acidic catalyst can be neutralized by addition of a base, for example KOH or NaOH, and filtered off if required.

It is clear to the person skilled in the art that the orientation of the hydrocarbyl radicals $R^4$ and optionally $R^3$ may depend on the conditions of the alkoxylation, for example on the catalyst selected for the alkoxylation. The alkylene oxide groups can thus be incorporated into the monomer either in the —(—$CH_2$—$CH(R^4)$—O—) orientation or else in the inverse —(—$CH(R^4)$—$CH_2$—O—)— orientation. The description in formula (I) should therefore not be considered to be restricted to a particular orientation of the $R^3$ or $R^4$ groups.

When the terminal OH group of the monomers (a) of the formula (I) (i.e. $R^5$=H) is to be etherified, this can be accomplished with customary alkylating agents known in principle to those skilled in the art, for example alkyl sulfates. For etherification, it is especially possible to use dimethyl sulfate or diethyl sulfates.

The preferred preparation process described for the monomers (I) has the advantage that the formation of potentially crosslinking by-products with two ethylenically unsaturated groups is substantially avoided. Accordingly, it is possible to obtain copolymers with a particularly low gel content.

Monomers (a) of the Formulae (II) and (III)

In the monomers of the formulae (II) and (III), $R^1$, $R^3$ and k are each defined as already outlined.

$R^6$ is an aliphatic and/or aromatic, straight-chain or branched hydrocarbyl radical having 8 to 40 carbon atoms, preferably 12 to 32 carbon atoms. For example, it may comprise n-alkyl groups such as n-octyl, n-decyl or n-dodecyl groups, phenyl groups, and especially substituted phenyl groups. Substituents on the phenyl groups may be alkyl groups, for example $C_1$-$C_6$-alkyl groups, preferably styryl groups. Particular preference is given to a tristyrylphenyl group.

The hydrophobically associating monomers of the formulae (II) and (III) and the preparation thereof are known in principle to those skilled in the art, for example from EP 705 854 A1.

Amounts of Monomers (a)

The amount of the monoethylenically unsaturated, hydrophobically associating monomers (a) is 0.1 to 15% by weight, based on the total amount of all monomers in the copolymer, especially 0.1 to 10% by weight, preferably 0.2 to 5% by weight and more preferably 0.5 to 2% by weight.

Particular preference is given to using monomers (a) of the general formula (I) to prepare the inventive copolymers, most preferably monomers (a) of the general formula (I) in which $R^2$ is an $R^{2b}$ radical.

Monomers (b)

Over and above the monomers (a), the hydrophobically associating copolymer used in accordance with the invention comprises at least two monoethylenically unsaturated, hydrophilic monomers (b) different than (a).

More preferably, the hydrophilic monomers (b) used are miscible with water in any ratio, but it is sufficient for execution of the invention that the inventive, hydrophobically associating copolymer possesses the water solubility mentioned at the outset. In general, the solubility of the monomers (b) in water at room temperature should be at least 50 g/l, preferably at least 150 g/l and more preferably at least 250 g/l.

According to the invention, the copolymer comprises at least one uncharged, monoethylenically unsaturated, hydrophilic monomer (b1) selected from the group of (meth)acrylamide, N-methyl(meth)acrylamide, N,N'-dimethyl(meth)acrylamide or N-methylol(meth)acrylamide. Preference is given to (meth)acrylamide, especially acrylamide. When mixtures of different monomers (b1) are used, at least 50 mol % of the monomers (b1) should be (meth)acrylamide, preferably acrylamide.

According to the invention, the copolymer used further comprises at least one hydrophilic, monoethylenically unsaturated anionic monomer (b2) which comprises at least one acidic group selected from the group of —COOH, —$SO_3H$ and —PO$_3$H$_2$ and salts thereof. Preference is given to monomers comprising COOH groups and/or —SO$_3$H groups, particular preference to monomers comprising —SO$_3$H groups. The monomers may of course also be the salts of the acidic monomers. Suitable counterions comprise especially alkali metal ions such as Li$^+$, Na$^+$ or K$^+$, and ammonium ions such as NH$_{4+}$ or ammonium ions with organic radicals.

Examples of monomers comprising COOH groups comprise acrylic acid, methacrylic acid, crotonic acid, itaconic acid, maleic acid or fumaric acid. Preference is given to acrylic acid.

Examples of monomers comprising sulfo groups comprise vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid. Preference is given to vinylsulfonic acid, allylsulfonic acid or 2-acrylamido-2-methylpropanesulfonic acid, and particular preference to 2-acrylamido-2-methylpropanesulfonic acid.

Examples of monomers comprising phospho groups comprise vinylphosphonic acid, allylphosphonic acid, N-(meth)acrylamidoalkylphosphonic acids or (meth)acryloyloxyalkylphosphonic acids, preference being given to vinylphosphonic acid.

For the sake of completeness, it should be mentioned that the monomers (b1) can be hydrolyzed at least partly to (meth)acrylic acid under some circumstances in the course of preparation and use. The copolymers used in accordance with the invention may accordingly comprise (meth)acrylic acid units, even if no (meth)acrylic acid units at all have been used for the synthesis. The tendency to hydrolysis of the monomers (b1) decreases with increasing content of sulfo groups. Accordingly, the presence of sulfo groups in the copolymer used in accordance with the invention is advisable.

The copolymers used in accordance with the invention may additionally optionally comprise at least one monoethylenically unsaturated, cationic monomer (b3) having ammonium ions.

Suitable cationic monomers (b3) comprise especially monomers having ammonium groups, especially ammonium derivatives of N-(ω-aminoalkyl)(meth)acrylamides or ω-aminoalkyl(meth)acrylic esters.

More particularly, monomers (b3) having ammonium groups may be compounds of the general formulae H$_2$C=C(R$^9$)—CO—NR$^9$—R$^{10}$—NR$^{11}$$_3$$^+$X$^-$ (Va) and/or H$_2$C=C(R$^9$)—COO—R$^{10}$—NR$^{11}$$_3$$^+$X$^-$ (Vb). In these formulae, R$^9$ is H or methyl, R$^9$ is H or a C$_1$-C$_4$-alkyl group, preferably H or methyl, and R$^{10}$ is a preferably linear C$_1$-C$_4$-alkylene group, for example a 1,2-ethylene group —CH$_2$—CH$_2$— or a 1,3-propylene group —CH$_2$—CH$_2$—CH$_2$—.

The R$^{11}$ radicals are each independently C$_1$-C$_4$-alkyl radicals, preferably methyl, or a group of the general formula —R$^{12}$—SO$_3$H where R$^{12}$ is a preferably linear C$_1$-C$_4$-alkylene group or a phenyl group, with the proviso that generally not more than one of the R$^{11}$ substituents is a substituent having sulfo groups. More preferably, the three R$^{11}$ substituents are methyl groups, i.e. the monomer has a —N(CH$_3$)$_3$$^+$ group. X$^-$ in the above formula is a monovalent anion, for example Cl$^-$. X$^-$ may of course also be a corresponding fraction of a polyvalent anion, though this is not preferred. Examples of preferred monomers (b3) of the general formula (Va) or (Vb) comprise salts of 3-trimethylammoniopropyl (meth)acrylamides or 2-trimethylammonioethyl(meth)acrylates, for example the corresponding chlorides such as 3-trimethylammoniopropylacrylamide chloride (DIMAPAQUAT) and 2-trimethylammoniomethyl methacrylate chloride (MADAME-QUAT).

The copolymers used in accordance with the invention may additionally also comprise further monoethylenically unsaturated hydrophilic monomers (b4) different than the hydrophilic monomers (b1), (b2) and (b3). Examples of such monomers comprise monomers comprising hydroxyl groups and/or ether groups, for example hydroxyethyl(meth)acrylate, hydroxypropyl (meth)acrylate, allyl alcohol, hydroxyvinyl ethyl ether, hydroxyvinyl propyl ether, hydroxyvinyl butyl ether, or compounds of the formula H$_2$C=C(R$^1$)—COO—(—CH$_2$—CH(R$^{13}$)—O—)$_b$—R$^{14}$ (VIa) or H$_2$C=C(R$^1$)—O—(—CH$_2$—CH(R$^{13}$)—O—)$_b$—R$^{14}$ (VIb), where R$^1$ is as defined above and b is a number from 2 to 200, preferably 2 to 100. The R$^{13}$ radicals are each independently H, methyl or ethyl, preferably H or methyl, with the proviso that at least 50 mol % of the R$^{13}$ radicals are H. Preferably at least 75 mol % of the R$^{13}$ radicals are H, more preferably at least 90 mol %, and they are most preferably exclusively H. The R$^{14}$ radical is H, methyl or ethyl, preferably H or methyl. Further examples of monomers (b4) comprise N-vinyl derivatives, for example N-vinylformamide, N-vinylacetamide, N-vinylpyrrolidone or N-vinylcaprolactam, and vinyl esters, for example vinyl formate or vinyl acetate. N-Vinyl derivatives can be hydrolyzed after polymerization to give vinylamine units, and vinyl esters to give vinyl alcohol units.

The amount of all hydrophilic monomers (b) in the inventive copolymer is, in accordance with the invention, 85 to 99.9% by weight, based on the total amount of all monomers in the copolymer, preferably 90 to 99.8% by weight.

The amount of the uncharged, hydrophilic monomers (b1) here is generally 30 to 95% by weight, preferably 30 to 85% by weight and more preferably 30 to 70% by weight, based on the total amount of all monomers used.

When the copolymer comprises only uncharged monomers (b1) and anionic monomers (b2), it has been found to be useful to use the uncharged monomers (b1) in an amount of 30 to 95% by weight and the anionic monomers (b2) in an amount of 4.9 to 69.9% by weight, each amount being based on the total amount of all monomers used. In this embodiment, the monomers (b1) are preferably used in an amount of 30 to 80% by weight and the anionic monomers (b2) in an amount of 19.9 to 69.9% by weight, and the monomers (b1) are more preferably used in an amount of 40 to 70% by weight and the anionic monomers (b2) in an amount of 29.9 to 59.9% by weight When the copolymer comprises uncharged monomers (b1), anionic monomers (b2) and cationic monomers (b3), it has been found to be useful to use the uncharged monomers (b1) in an amount of 30 to 95% by weight, and the anionic (b2) and cationic (b3) monomers together in an amount of 4.9 to 69.9% by weight, with the proviso that the molar (b2)/(b3) ratio is 0.7 to 1.3. The molar (b2)/(b3) ratio is preferably 0.8 to 1.2 and, for example, 0.9 to 1.1. This measure makes it possible to obtain copolymers which are particularly insensitive to salt burden. In this embodiment, the monomers (b1) are used in an amount of 30 to 80% by weight, and the anionic and cationic monomers (b2)+(b3) together in an amount of 19.9 to 69.9% by weight, and the monomers (b1) are more preferably used in an amount of 40 to 70% by weight and the anionic and cationic monomers (b2)+(b3) together in an amount of 29.9 to 59.9% by weight, where the molar ratio already mentioned should be observed in each case.

Monomers (c)

In addition to the hydrophilic monomers (a) and (b), the inventive copolymers may optionally comprise ethylenically unsaturated monomers different than the monomers (a) and (b), preferably monoethylenically unsaturated monomers (c). Of course, it is also possible to use mixtures of a plurality of different monomers (c).

Such monomers can be used for fine control of the properties of the copolymer used in accordance with the invention. If present at all, the amount of such optionally present monomers (c) may be up to 14.9% by weight, preferably up to 9.9% by weight, more preferably up to 4.9% by weight, based in each case on the total amount of all monomers. Most preferably, no monomers (c) are present.

The monomers (c) may, for example, be monoethylenically unsaturated monomers which have more hydrophobic character than the hydrophilic monomers (b) and which are accordingly water-soluble only to a minor degree. In general, the solubility of the monomers (c) in water at room temperature is less than 50 g/l, especially less than 30 g/l. Examples of such monomers comprise N-alkyl- and N,N,'-dialkyl(meth)acrylamides, where the number of carbon atoms in the alkyl radicals together is at least 3, preferably at least 4. Examples of such monomers comprise N-butyl(meth)acrylamide, N-cyclohexyl(meth)acrylamide or N-benzyl(meth)acrylamide.

Preparation of the Hydrophobically Associating Copolymers

The copolymers used in accordance with the invention can be prepared by methods known in principle to those skilled in the art, by free-radical polymerization of the monomers (a), (b) and optionally (c), for example by solution or gel polymerization in the aqueous phase.

For polymerization, the monomers (a), (b), optionally (c), initiators and optionally further assistants for polymerization are used in an aqueous medium.

In a preferred embodiment, the preparation is undertaken by means of gel polymerization in the aqueous phase. For gel polymerization, a mixture of the monomers (a), (b) and optionally (c), initiators and optionally further assistants with water or an aqueous solvent mixture is first provided. Suitable aqueous solvent mixtures comprise water and water-miscible organic solvents, where the proportion of water is generally at least 50% by weight, preferably at least 80% by weight and more preferably at least 90% by weight. Organic solvents in this context include especially water-miscible alcohols such as methanol, ethanol or propanol. Acidic monomers can be fully or partly neutralized before the polymerization. The concentration of all components except the solvents in the course of the polymerization is typically approx. 20 to 60% by weight, preferably approx. 30 to 50% by weight. The polymerization should especially be performed at a pH in the range from 5.0 to 7.5 and preferably at a pH of 6.0.

Polymerization in the Presence of a Nonpolymerizable, Interface-active Compound

In a preferred embodiment of the invention, the copolymers used are prepared in the presence of at least one nonpolymerizable, surface-active compound (T).

The nonpolymerizable, surface-active compound (T) is preferably at least one nonionic surfactant, but anionic and cationic surfactants are also suitable to the extent that they do not take part in the polymerization reaction. They may especially be surfactants, preferably nonionic surfactants, of the general formula $R^{13}$—Y' where $R^{13}$ is a hydrocarbyl radical having 8 to 32, preferably 10 to 20 and more preferably 12 to 18 carbon atoms, and Y' is a hydrophilic group, preferably a nonionic hydrophilic group, especially a polyalkoxy group.

The nonionic surfactant is preferably an ethoxylated long-chain aliphatic alcohol which may optionally comprise aromatic components.

Examples include: $C_{12}C_{14}$-fatty alcohol ethoxylates, $C_{16}C_{18}$-fatty alcohol ethoxylates, $C_{13}$-oxo alcohol ethoxylates, $C_{10}$-oxo alcohol ethoxylates, $C_{13}C_{15}$-oxo alcohol ethoxylates, $C_{10}$-Guerbet alcohol ethoxylates and alkylphenol ethoxylates. Useful compounds have especially been found to be those having 5 to 20 ethyleneoxy units, preferably 8 to 18 ethyleneoxy units. It is optionally also possible for small amounts of higher alkyleneoxy units to be present, especially propyleneoxy and/or butyleneoxy units, though the amount in the form of ethyleneoxy units should generally be at least 80 mol % based on all alkyleneoxy units.

Especially suitable are surfactants selected from the group of the ethoxylated alkylphenols, the ethoxylated, saturated iso-$C_{13}$-alcohols and/or the ethoxylated C10-Guerbet alcohols, where in each case 5 to 20 ethyleneoxy units, preferably 8 to 18 ethyleneoxy units, are present in alkoxy radicals.

Surprisingly, the addition of nonpolymerizable, interface-active compounds (T) during the polymerization leads to a distinct improvement in performance properties of the copolymer in polymer flooding. More particularly, the thickening action is increased and the gel content of the copolymer is also reduced. This effect can probably be explained as follows, without any intention that the invention thus be tied to this explanation. In the case of polymerization without presence of a surfactant, the hydrophobically associating comonomers (a) form micelles in the aqueous reaction medium. In the polymerization, this leads to blockwise incorporation of the hydrophobically associating regions into the polymer. If, in accordance with the invention, an additional surface-active compound is present in the preparation of the copolymers, mixed micelles form. These mixed micelles comprise polymerizable and nonpolymerizable components. As a result, the hydrophobically associating monomers are then incorporated in relatively short blocks. At the same time, the number of these relatively short blocks is greater per polymer chain. Thus, the structure of the copolymers prepared in the presence of a surfactant differs from those without the presence of a surfactant.

The nonpolymerizable, interface-active compounds (T) can generally be used in an amount of 0.1 to 5% by weight, based on the amount of all monomers used.

The weight ratio of the nonpolymerizable, interface-active compounds (T) used to the monomers (a) is generally 4:1 to 1:4, preferably 2:1 to 1:2, more preferably 1.5:1 to 1:1.5 and, for example, approx. 1:1.

Performance of the Polymerization

For the polymerization, the components required are first mixed with one another. The sequence with which the components are mixed for polymerization is unimportant; what is important is merely that, in the preferred polymerization method, the nonpolymerizable, interface-active compound (T) is added to the aqueous polymerization medium before the initiation of the polymerization.

The mixture is subsequently polymerized thermally and/or photochemically, preferably at −5° C. to 80° C. If polymerization is effected thermally, preference is given to using polymerization initiators which can initiate the polymerization even at comparatively low temperature, for example redox initiators. The thermal polymerization can be undertaken even at room temperature or by heating the mixture, preferably to temperatures of not more than 50° C. The photochemical polymerization is typically undertaken at temperatures of −5 to 10° C. It is also possible to combine photochemical and thermal polymerization with one another, by adding both initiators for the thermal and photochemical polymerization to the mixture. In this case, the polymerization is first initiated photochemically at low temperatures, preferably −5 to +10° C. The heat of reaction released heats the mixture, which additionally initiates the thermal polymerization. By means of this combination, it is possible to achieve a conversion of more than 99%.

In a further preferred embodiment of the polymerization, it is also possible to perform the reaction with a mixture of a redox initiator system and a thermal initiator which does not decompose until relatively high temperatures. This may, for example, be a water-soluble azo initiator which decomposes within the temperature range from 40° C. to 70° C. The polymerization here is at first initiated at low temperatures of, for example, 0 to 10° C. by the redox initiator system. The heat of reaction released heats the mixture, and this additionally initiates the polymerization by virtue of the initiator which does not decompose until relatively high temperatures.

The gel polymerization is generally effected without stirring. It can be effected batchwise by irradiating and/or heating the mixture in a suitable vessel at a layer thickness of 2 to 20 cm. The polymerization gives rise to a solid gel. The polymerization can also be effected continuously. For this purpose, a polymerization apparatus is used, for example, which possesses a conveyor belt to accommodate the mixture to be polymerized. The conveyor belt is equipped with devices for heating and/or for irradiating with UV radiation. In this method, the mixture is poured onto one end of the belt by means of a suitable apparatus, the mixture is polymerized in the course of transport in belt direction, and the solid gel can be removed at the other end of the belt.

The gel obtained is preferably comminuted and dried after the polymerization. The drying should preferably be effected at temperatures below 100° C. To prevent conglutination, it is possible to use a suitable separating agent for this step. This gives the hydrophobically associating copolymer as granules or powder.

Further details of the performance of a gel polymerization are disclosed, for example in DE 10 2004 032 304 A1, paragraphs [0037] to [0041].

Since the polymer powder or granules obtained are generally used in the form of an aqueous solution in the course of application at the site of use, the polymer has to be dissolved in water on site. This may result in undesired lumps with the high molecular weight polymers described. In order to avoid this, it is possible to add an assistant which accelerates or improves the dissolution of the dried polymer in water to the inventive polymers as early as in the course of synthesis. This assistant may, for example, be urea.

The resulting copolymers generally have a weight-average molecular weight $M_w$ of $1*10^6$ g/mol to $30*10^6$ g/mol, preferably $5*10^6$ g/mol to $20*10^6$ g/mol.

Processes for Mineral Oil Production

To execute the process according to the invention, at least one production borehole and at least one injection borehole are sunk into the mineral oil deposit. In general, a deposit is provided with several injection boreholes and with several production boreholes. An aqueous formulation of the copolymer described is injected into the mineral oil deposit through the at least one injection borehole, and mineral oil is withdrawn from the deposit through at least one production borehole. The term "mineral oil" in this context of course does not only mean single-phase oil, but the term also comprises the customary crude oil-water emulsions. As a result of the pressure generated by the formulation injected, known as the "polymer flood", the mineral oil flows in the direction of the production borehole and is produced via the production borehole.

The deposit temperature of the mineral oil deposit to which the process according to the invention is applied is, in accordance with the invention, 35 to 120° C., preferably 40° C. to 90° C., more preferably 45° C. to 75° C. and, for example, 50° C. to 70° C.

It is clear to the person skilled in the art that a mineral oil deposit may also have a certain temperature distribution. The deposit temperature mentioned relates to the region of the deposit between the injection and production boreholes which is covered by the polymer flooding. Methods for determining the temperature distribution of a mineral oil deposit are known in principle to those skilled in the art. The temperature distribution is generally undertaken from temperature measurements at certain sites in the formation in combination with simulation calculations, which take account, inter alia, of the amounts of heat introduced into the formation and the amounts of heat removed from the formation.

The process according to the invention can be employed especially in the case of mineral oil deposits having an average permeability of 10 mD to 4 D, preferably 100 mD to 2 D and more preferably 200 mD to 1 D. The permeability of a mineral oil formation is reported by the person skilled in the art in the unit "darcy" (abbreviated to "D" or "mD" for "millidarcies") and can be determined from the flow rate of a liquid phase in the mineral oil formation as a function of the pressure differential applied. The flow rate can be determined in core flooding tests with drill cores taken from the formation. Details on this subject can be found, for example, in K. Weggen, G. Pusch, H. Rischmüller in *"Oil and Gas"*, pages 37 ff., *Ulmann's Encyclopedia of Industrial Chemistry*, online edition, Wiley-VCH, Weinheim 2010. It is clear to the person skilled in the art that the permeability in a mineral oil deposit need not be homogeneous, but generally has a certain distribution, and the reported permeability of a mineral oil deposit is accordingly an average permeability.

To execute the process, an aqueous formulation which comprises, in addition to water, at least the hydrophobically associating copolymer described is used. It is of course also possible to use mixtures of different hydrophobically associating copolymers.

The formulation can be made up in fresh water, or else in water comprising salts. Of course, it can also comprise mixtures of different salts. For example, it is possible to use sea water to make up the aqueous formulation, or it is possible to use produced formation water, which is reused in this manner. In the case of offshore production platforms, the formulation is generally made up in sea water. In the case of onshore production units, the polymer can advantageously first be dissolved in fresh water, and the resulting solution can be diluted to the desired use concentration with formation water. The formulation can preferably be prepared by initially charging the water, sprinkling in the copolymer as a powder and mixing it with the water.

The salts may especially be alkali metal salts and alkaline earth metal salts. Examples of typical cations comprise $Na^+$, $Mg^{2+}$ or $Ca^{2+}$, and examples of typical anions comprise chloride, bromide, hydrogencarbonate, sulfate or borate.

When the formulation comprises salts, generally at least one or more than one alkali metal ion, especially at least $Na^+$, is present. In addition, it is also possible for alkaline earth metal ions to be present, where the weight ratio of alkali metal ions/alkaline earth metal ions is generally $\geq 2$, preferably $\geq 3$. The anions present are generally at least one or more than one halide ion, especially at least $Cl^-$. In general, the amount of $Cl^-$ is at least 50% by weight, preferably at least 80% by weight, based on the sum of all anions.

The total amount of all salts in the aqueous formulation is generally 20 000 ppm to 350 000 ppm (parts by weight), based on the sum of all components of the formulation. When sea water is used to make up the formulation, the salt content is generally 20 000 ppm to 50 000 ppm, and, when formation water is used, generally 100 000 ppm to 250 000 ppm. The amount of alkaline earth metal ions may preferably be 1000 to 53 000 ppm.

The aqueous formulation may of course comprise further components. Examples of further components comprise biocides, stabilizers or inhibitors.

The concentration of the copolymer is fixed such that the aqueous formulation has the desired viscosity for the end use. The viscosity of the formulation should generally be at least 5 mPas (measured at 25° C. and a shear rate of 7 s$^{-1}$), preferably at least 10 mPas.

According to the invention, the concentration of the polymer in the formulation is 0.01 to 2% by weight based on the sum of all components of the aqueous formulation. The amount is preferably 0.05 to 0.5% by weight, more preferably 0.04 to 0.2% by weight and, for example, approx. 0.1% by weight.

The injection of the aqueous copolymer formulation can be undertaken by means of customary apparatus. The formulation can be injected into one or more injection boreholes by means of customary pumps. The injection boreholes are typically lined with cemented steel tubes, and the steel tubes are perforated at the desired site. The formulation exits through the perforation from the injection borehole into the mineral oil formation. The pressure applied by means of the pumps, in a manner known in principle, fixes the flow rate of the formulation and hence also the shear stress with which the aqueous formulation enters the formation. The shear stress on entry into the formation can be calculated by the person skilled in the art in a manner known in principle on the basis of the Hagen-Poiseuille law using the area flowed through on entry into the formation, the mean pore radius and the volume flow. The average porosity of the formation can be determined in a manner known in principle by measurements on drill cores. By its nature, the greater the volume flow of aqueous copolymer formulation injected into the formation, the greater the shear stress.

The rate of injection can be fixed by the person skilled in the art according to the conditions in the formation. Preferably, the shear rate on entry of the aqueous polymer formulation into the formation is at least 30 000 s$^{-1}$, preferably at least 60 000 s$^{-1}$ and more preferably at least 90 000 s$^{-1}$.

Copolymers particularly preferred for execution of the process comprise monomers (a) of the general formula $H_2C=CH-O-(CH_2)_{n'}-O-(-CH_2-CH_2-O-)_k-(-CH_2-CH(R^4)-O-)_l-H$ (Ia) where n' is 2 to 6, preferably 2 to 4 and more preferably 4. $R^4$ in the preferred variant is a hydrocarbyl radical having 3 to 10 carbon atoms, especially an n-propyl radical. In addition, in formula (Ia), k is a number from 20 to 30 and l is a number from 6 to 20, preferably 8 to 18. The amount of the monomers (a) of the formula (Ia) is 0.2 to 5% by weight, preferably 0.5 to 2% by weight. As monomer (b1), the preferred copolymer comprises 40 to 60% by weight of acrylamide and, as monomer (b2), 35 to 55% by weight of a monomer (b2) having sulfo groups, preferably 2-acrylamido-2-methylpropanesulfonic acid or salts thereof.

Further copolymers preferred for execution of the process likewise comprise 0.2 to 5% by weight, preferably 0.5 to 2% by weight, of monomers (a) of the general formula (Ia) and 30 to 40% by weight of acrylamide. They additionally comprise 25 to 35% by weight of at least one monomer (b2) having sulfo groups, preferably 2-acrylamido-2-methylpropanesulfonic acid or salts thereof, and 25 to 35% by weight of at least one cationic monomer having ammonium ions, preferably salts of 3-trimethylammoniopropyl(meth)acrylamides and 2-trimethylammonioethyl(meth)acrylates.

The examples which follow are intended to illustrate the invention in detail:

MONOMERS (A) USED

Monomer M1

Hydroxybutyl Vinyl Ether Alkoxylate with 22 Eo Units and 12 Peo Units

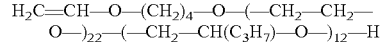

A 1 l stirred stainless steel autoclave is initially charged with 44.1 g of hydroxybutyl vinyl ether. Subsequently, 3.12 g of KOMe (32% in MeOH) are metered in and the methanol is drawn off at 80° C. and approx. 30 mbar. This is followed by heating to 140° C., purging of the reactor with nitrogen and establishment of a nitrogen pressure of 1.0 bar. Then 368 g of EO are metered in within approx. 3 h. After continued reaction at 140° C. for a half hour, the reactor is cooled to 125° C., and a total of 392 g of pentene oxide are metered in over the course of 3.5 h. The reaction continues overnight.

The product has an OH number of 31.9 mg KOH/g (theory: 26.5 mg KOH/g). The OH number is determined by means of the ESA method.

PREPARATION OF THE COPOLYMERS

Polymer 1:

Preparation of a Copolymer from 2% by Weight of Monomer M1, 50% by Weight of Acrylamide and 48% by Weight of 2-acrylamido-2-methylpropanesulfonic Acid A plastic bucket with magnetic stirrer, pH meter and thermometer is initially charged with 121.2 g of a 50% aqueous solution of NaATBS (2-acrylamido-2-methylpropanesulfonic acid, sodium salt), and then 155 g of distilled water, 0.6 g of a defoamer (Surfynol® DF-58), 0.2 g of a silicone defoamer (Baysilon® EN), 2.3 g of monomer M1, 114.4 g of a 50% aqueous solution of acrylamide, 1.2 g of pentasodium diethylenetriaminepentaacetate (complexing agent, as a 5% aqueous solution) and 2.4 g of a nonionic surfactant (nonylphenol, alkoxylated with 10 units of ethylene oxide) are added successively.

After adjusting the pH with a 20% or 2% sulfuric acid solution to a value of 6 and adding the rest of the water, the monomer solution is adjusted to the start temperature of 5° C. The total amount of water is such that—after the polymerization—a solids concentration of approx. 30 to 36% by weight is attained. The solution is transferred to a thermos flask, a temperature sensor for the temperature recording is provided and the solution is purged with nitrogen for 30 minutes. The polymerization is then initiated by adding 1.6 ml of a 10% aqueous solution of a water-soluble cationic azo initiator 2,2'-azobis(2-amidinopropane)dihydrochloride (Wako V-50), 0.12 ml of a 1% aqueous solution of tert-butyl hydroperoxide and 0.24 ml of a 1% sodium sulfite solution. After the initiators have been added, the temperature rises to approx. 80° C. within 15 to 30 min. After 30 min, the reaction vessel is placed into a drying cabinet at approx. 80° C. for approx. 2 h to complete the polymerization. The total duration of the polymerization is approx. 2 h to 2.5 h.

A gel block is obtained, which, after the polymerization has ended, is comminuted with the aid of a meat grinder. The gel granules obtained are dried in a fluidized bed dryer at 55° C. for two hours. This gives white, hard granules which are converted to a pulverulent state by means of a centrifugal mill. This gives a copolymer with a weight-average molecular weight of approx. $1*10^6$ g/mol to $30*10^6$ g/mol.

Polymer 2:

Preparation of a Copolymer from 5% by Weight of Monomer M1, 50% by Weight of Acrylamide and 45% by Weight of 2-acrylamido-2-methylpropanesulfonic Acid The procedure is as in Example 1, except that the amount of monomer M1 is increased from 2% by weight to 5% by weight based on the sum of all monomers, and the amount of 2-acrylamido-2-methylpropanesulfonic acid is reduced from 48% by weight to 45% by weight. The amount of the surfactant (proportions by mass) corresponds to that of monomer M1.

Comparative Polymer 1:

This is a commercially available copolymer for polymer flooding, formed from approx. 50% by weight of acrylamide and approx. 50% by weight of 2-acrylamido-2-methylpropanesulfonic acid with a weight-average molecular weight $M_w$ of approx. 8 to $13*10^6$ g/mol.

Comparative Polymer 2:

This is a commercially available copolymer for polymer flooding, formed from approx. 72% by weight of acrylamide and approx. 28% by weight of sodium acrylate units, having a weight-average molecular weight $M_w$ of approx. 20,000,000 g/mol.

Comparative Polymer 3:

A commercially available xanthan polymer was used for the tertiary mineral oil production.

Performance Tests

Determination of Viscosity

The viscosity measurements were carried out with a Brookfield LVDV-UL viscometer at a shear rate of 7 s$^{-1}$.

For the viscosity measurements, aqueous solutions of the polymers were used. To dissolve the polymers, the following aqueous media were used:

Tap Water:
Total salinity 123 mg/l

Sea Water (Synthetic):
Total salinity: approx. 35 000 mg/l
Na$^+$ 10 692 mg/l, K$^+$ 420 mg/l, Mg$^{2+}$ 1295 mg/l, Ca$^{2+}$ 422 mg/l, Cl$^-$ 19218 mg/l, HCO$_3^-$ 145 mg/l, SO$_4^{2-}$ 2697 mg/l
Ratio of alkali metal ions/alkaline earth metal ions: 6.2

Deposit Water (Synthetic):
Total salinity: 185 548 mg/l
Na$^+$ 52 079 mg/l, Mg$^{2+}$ 2681 mg/l, Ca$^{2+}$ 15 383 mg/l, Cl$^-$ 115 105 mg/l, borate 117 mg/l, SO$_4^{2-}$ 183 mg/l.
Ratio of alkali metal ions/alkaline earth metal ions: 2.9; deposit water with high Ca$^{2+}$ content The following tests were carried out:

Test Series 1:
Solutions of polymers 1, 2 and C1, C2 and C3 were made up in a concentration of in each case 1500 ppm in sea water. The viscosity of the solutions was measured at 20° C. and at 60° C. FIG. 1 shows the results obtained.

The aqueous solutions of comparative polymers 2 and 3 have a higher viscosity at 20° C. than the polymers 1 and 2 used in accordance with the invention. For all comparative polymers, the viscosity at 60° C. is, however, much lower than at 20° C. For polymers 1 and 2, in contrast, the viscosity at 60° C. is significantly higher than at 20° C.

Test Series 2:
Solutions of polymers 1 and C2 were made up in a concentration of in each case 1200 ppm in tap water, and the viscosity of each of the solutions was measured at 30° C., 60° C., 90° C. and 120° C. FIG. 2 shows the results obtained.

The solution of polymer 1 has, at 30° C., a viscosity approx. 4× higher than the solution of polymer C1. The viscosity of the latter solution decreases with increasing temperature. The viscosity of the aqueous solution of polymer 1 increases very significantly between 30° C. and 60° C., and decreases only when the temperature is increased further. Even at 120° C., the viscosity of the solution of polymer 1 is still greater than that of comparative polymer C1.

Test Series 3 to 5:
Solutions of polymer 1 were made up at different concentrations in tap water (test series 2), sea water (test series 3) and deposit water (test series 4), and the viscosity of each of the solutions was measured at 30° C., 60° C., 90° C. and 120° C. The results are shown in FIGS. 2 to 5. The figures also comprise the information with regard to the concentrations used in each case.

In all tests, the viscosity of the solutions increases significantly from 30° C. to 60° C. and then decreases again. The viscosity maximum is in the range from approx. 50° C. to 70° C.

Test Series 6:
Solutions of comparative polymer C1 were made up at different concentrations in tap water, and the viscosity of each of the solutions was measured at 30° C., 60° C., 90° C. and 120° C. The results are shown in FIG. 6. The figure also comprises the information with regard to the concentrations used in each case.

For the comparative polymer, the viscosity level is firstly lower than for inventive polymer 1.

In addition, the viscosity does not pass through a maximum, but decreases continuously with increasing temperature.

Core Flooding Tests

The copolymer of example 1 and comparative polymer C1 were also used to carry out core flooding tests.

In each case, sandstone cores (composition 99% by weight of quartz) with an average porosity of approx. 2 darcies were used. The properties of the sandstone cores used are compiled in table 3 below.

TABLE 3

Properties of the cores used

|  | Core 1 | Core 2 |
|---|---|---|
| Copolymer used | polymer 1 | C1 |
| Length | 8.53 cm | 8.56 cm |
| Cross-sectional area | 7.02 cm$^2$ | 7.02 cm$^2$ |
| Gas permeability | 1993 mD | 2350 mD |
| Water permeability | 1734 mD | 2077 mD |
| Porosity | 23.6% | 24.6% |
| Pore volume | 14.2 cm$^3$ | 14.8 cm$^3$ |

For the core flooding tests, solutions of the polymers in deposit water of the composition detailed above with a total salt content of 186 g/l were prepared. The concentration of polymer 1 was 1200 ppm and that of comparative polymer C1 3000 ppm.

For the tests, a customary apparatus for core flooding was used, in which the core is introduced into a pressure-resistant steel shell sealed at both ends, one end having an orifice for injection of gases and aqueous solutions and the other end an outlet orifice. Gases or the aqueous formulations to be tested are injected with a particular pressure through the inlet orifice and flow through the core under the influence of the pressure. The entire apparatus is stored in a bath for temperature control. The tests were carried out at 55° C.

By varying the injection rate (i.e. variation of the pressure applied), it is possible to calculate the apparent viscosity of the aqueous formulations according to equations 1 to 3:

RF=λ(water)/λ(polymer solution) where λ=k/μ    (equation 1)

RF=resistance factor, λ=mobility, k=permeability, μ=viscosity

RRF=λ(water)/λ(water after the polymer solution has flowed through)

RRF=residual resistance factor $\mu_{app} = (RF/RRF) \cdot \mu_{water}$

FIG. 7 shows the apparent viscosity of the two polymer solutions as a function of the flow rate in the core in m/day.

The apparent viscosities of the solutions determined by means of the core flooding test show that the viscosity efficiency of the polymer used in accordance with the invention at low flow rates is much better than that of comparative polymer 1, which does not have any hydrophobically associating monomers but apart from that is of similar structure to polymer 1. Even at a concentration of 1200 ppm, a much higher viscosity is achieved than with comparative polymer 1 at a concentration of 3000 ppm.

The core flooding tests also show that the solution of polymer 1 used in accordance with the invention has highly shear-diluting (thixotropic) behavior, i.e. the viscosity of the polymer solution decreases very significantly with increasing flow rate. This is particularly advantageous for polymer flooding since—as already stated above—the flow rate is at its highest on entry into the formation and decreases again with increasing distance from the injection site. Advantageously, the viscosity of the solution decreases specifically at this point, and thus enables easy injection into the formation. The solution of comparative polymer 1, in contrast, exhibits shear-thickening (dilatant) behavior, i.e. the viscosity increases with increasing flow rate.

The invention claimed is:

1. A process for mineral oil production, in which an aqueous formulation comprising at least one water-soluble, hydrophobically associating copolymer is injected through at least one injection borehole into a mineral oil deposit, and crude oil is withdrawn from the deposit through at least one production borehole, wherein the water-soluble, hydrophobically associating copolymer comprises (a) 0.1 to 15% by weight of at least one monoethylenically unsaturated, hydrophobically associating monomer (a) selected from the group of $H_2C=C(R^1)-R^2-O-(-CH_2-CH(R^3)-O-)_k-(-CH_2-CH(R^4)-O-)_l-R^5$  (I), $H_2C=C(R^1)-O-(-CH_2-CH(R^3)-O-)_k-R^6$  (II), $H_2C=C(R^1)-(C=O)-O-(-CH_2-CH(R^3)-O-)_k-R^6$  (III), where the $-(-CH_2-CH(R^3)-O-)_k$ and $-(CH_2-CH(R^4)-O-)_l$ units are arranged in block structure in the sequence shown in formula (I) and the radicals and indices are each defined as follows:

k: a number from 15 to 30, l: a number from 5 to 25, $R^1$: H or methyl, $R^2$: a single bond or a divalent linking group selected from the group of $-(C_nH_{2n})-[R^{2a}]$, $-O-(C_nH_{2n'})-[R^{2b}]$ and $-C(O)-O-(C_{n''}H_{2n''})-[R^{2c}]$, where n, n' and n'' are each natural numbers from 1 to 6, $R^3$: each independently H, methyl or ethyl, with the proviso that at least 50 mol% of the $R^2$ radicals are H, $R^4$: each independently a hydrocarbyl radical having at least 2 carbon atoms or an ether group of the general formula $-CH_2-O-R^{4'}$, where $R^{4'}$ is a hydrocarbyl radical having at least 2 carbon atoms, $R^5$: H or a hydrocarbyl radical having 1 to 30 carbon atoms, $R^6$: an aliphatic and/or aromatic, straight-chain or branched hydrocarbyl radical having 8 to 40 carbon atoms, and also (b) 85 to 99.9% by weight of at least two monoethylenically unsaturated, hydrophilic monomers (b) different than (a), where the monomers (b) comprise (b1) at least one uncharged, monoethylenically unsaturated, hydrophilic monomer (b1), selected from the group of (meth)acrylamide, N-methyl(meth)acrylamide, N,N'-dimethyl(meth)acrylamide or N-methylol(meth)acrylamide, and (b2) at least one anionic, monoethylenically unsaturated, hydrophilic monomer (b2) which at least one acidic group selected from the group of $-COOH$, $-SO_3H$ and $-PO_3H_2$ and salts thereof, wherein at least one monomer comprising $-SO_3H$ groups or a salt thereof is present, wherein the uncharged monomers (b1) are used in an amount of 30 to 95% by weight and the anionic monomers (b2) in an amount of 4.9 to 69.9% by weight, where the proportions are each based on the total amount of all monomers in the copolymer, the copolymer has a weight-average molecular weight $M_w$ of $1 \cdot 10^6$ g/mol to $30 \cdot 10^6$ g/mol, the amount of the copolymer in the formulation is 0.02 to 2% by weight, and the temperature of the mineral oil deposit is 40 to 90° C.

2. The process according to claim 1, wherein the temperature of the mineral oil deposit is 45 to 70° C.

3. The process according to claim 1, wherein the aqueous formulation further comprises salts in an amount of 20 000 ppm to 350 000 ppm.

4. The process according to claim 3, wherein the proportion of alkaline earth metal ions is 1000 to 53 000 ppm.

5. The process according to claim 1, wherein sea water is used to make up the aqueous formulation.

6. The process according to claim 1, wherein produced deposit water is used to make up the aqueous formulation.

7. The process according to claim 1, wherein the average permeability of the formation is 10 millidarcies to 4 darcies.

8. The process according to claim 1, wherein the average permeability of the formation is 100 millidarcies to 2 darcies.

9. The process according to claim 1, wherein polymer solution is injected into the formation with a shear rate of at least 30 000 s$^{-1}$.

10. The process according to claim 1, wherein the amount of the copolymer in the formulation is 0.05 to 0.5% by weight.

11. The process according to claim 1, wherein the hydrophobically associating monomer (a) is at least one of the formula (I), and where
$R^4$ is a hydrocarbyl radical having 3 to 8 carbon atoms,
k is a number from 20 to 30, and
$R^5$ is H, methyl or ethyl.

12. The process according to claim 11, wherein
$R^4$ is an n-propyl radical,
k is a number 22-25, and
$R^5$ is H.

13. The process according to claim 1, wherein the copolymer further comprises at least one cationic, monoethylenically unsaturated monomer (b3) comprising ammonium ions.

14. The process according to claim 13, wherein the cationic monomer (b3) comprises salts of 3-trimethylammoniumpropyl(meth)acrylamides and 2-trimethylammoniumethyl (meth)acrylates.

15. The process according to claim 13, wherein the uncharged monomers (b1) are used in an amount of 30 to 95% by weight and the anionic monomers (b2) and cationic monomers (b3) together in an amount of 4.9 to 69.9% by weight, with the proviso that the molar (b2)/(b3) ratio is 0.7 to 1.3, and where the amounts are each based on the total amount of all monomers used.

16. The process according to claim 1, wherein the amount of monomers (a) is 0.2 to 5% by weight.

17. The process according to claim 1, wherein the preparation of the hydrophobically associating copolymer is undertaken in the presence of a nonpolymerizable, surface-active compound.

* * * * *